Patented Sept. 10, 1940

2,214,366

UNITED STATES PATENT OFFICE 2,214,366

DRILLING FLUID COMPOSITION

John W. Freeland, San Francisco, and Harold T. Byck, Berkeley, Calif., assignors to Shell Development Company, San Francisco, Calif., a corporation of Delaware No Drawing. Application February 23, 1939, Serial No. 257,972

6 Claims. (Cl. 255—1)

This invention pertains to the drilling of oil wells, and relates more particularly to a method and composition for preventing or minimizing the loss of drilling fluid from the well into the formation.

An essential feature of rotary drilling is the use of a drilling fluid or mudflush, consisting of a colloidal suspension in a suitable liquid of a material such as clay, sometimes weighted down with additional comminuted heavy material such as barytes, galena, red lead, etc.

The functions of the mudflush are to lubricate the bit, to carry the cuttings up to the surface, to keep down the formation pressures, and to form on the walls of the borehole a sheath capable of preventing or minimizing the penetration of the mudflush into the formation, and its loss therein.

As the mudflush is circulated in the borehole under a pressure generally exceeding that of the formation, its liquid component, together with the smaller colloidal or solid particles suspended therein, flows into the formation through the interstices, passages and pores between the grains of the formation sands. The larger clay or solid particles, however, become arrested between adjacent sand grains and act as plugs, decreasing the area of the flow passages therebetween, and allowing smaller clay particles to become in turn arrested and to act as plugs in said passages. A mudflush of good plastering properties quickly forms in this manner a substantially liquid-impervious mudsheath on the walls of the borehole.

In many cases, however, the formation of the sheath, or the failure of the latter to be formed depends less on the plastering properties of the mudflush than on the structural properties of the strata traversed by the well.

Thus, in formations having fissures or crevices, and especially in low pressure, coarse-grained, porous formations, the solid particles ordinarily present in the mudflush easily pass through the interstices between adjacent sand or gravel grains without exerting any plugging action, with the result that large amounts of the mudflush are carried into the formations, causing a loss of circulation, which may in turn lead to the freezing of the drill string, the collapse of the walls of the borehole, or other undesirable consequences.

In order to cause a sheath to be formed on the walls of the borehole opposite these porous formations, thereby effectively sealing them off and preventing loss of circulation, various methods and mudflush compositions have been developed in the art. Thus, it has been proposed to add to the mudflushes materials such as mica flakes, cotton seed hulls, sugar cane fibers, sawdust, fish scales, and other substances having a relatively large particle size and capable of serving as plugs for sealing off the pores of a coarse-grained formation.

The use of these mudflush compositions entails, however, certain drawbacks, and does not always achieve the results sought, as will be shown hereinbelow.

It is, therefore, an object of this invention to provide a method for sealing off coarse-grained porous formations by means of a mudflush having added thereto a mixture of a flaky and of a fibrous sealing materials, said mudflush being capable of forming a thin substantially water-impervious mudsheath tenaciously adhering to the walls of the borehole.

It is also an object of this invention to provide for this purpose a mudflush in which the flaky and the fibrous materials added for sealing purposes are of mineral nature and are not susceptible to attack and disintegration by acids used in treating oil wells.

Experience has shown that one of the most effective materials which may be added to drilling fluids to improve their plastering properties is mica. The use of mica has given especially favorable results in sealing off oil-bearing layers, to prevent the drilling fluid from penetrating into and decreasing the permeability and the productivity of said oil-bearing layers, as explained in Patent No. 1,807,082 to Boynton.

The particular effectiveness of mica in this case may be ascribed to the fact that the waxy, paraffinic or asphaltic matter usually accumulating at the walls' face in producing zones causes the mica flakes to become embedded therein and to adhere tenaciously to said walls, while also serving as a sealing agent between separate flakes, and between flakes and formation sand grains, whereby a substantially fluid-impervious sheath is formed.

It must, however, be noted that the need for a sealing material in mudflush for preventing loss of circulation, or for regaining circulation usually arises in connection with porous layers traversed before the producing zone is reached. Attempts to seal off such coarse-grained, low pressure strata by means of a mudsheath formed of a drilling fluid comprising mica have commonly met with failure, since no perfect fluid-impervious seal can be established between the hard, irregularly-shaped sand grains of the formation and the equally hard and irregularly-shaped mica flakes, in the same manner as no liquid or gastight seal can be formed between two imperfectly machined metallic surfaces, unless a gasket is provided therebetween.

It has now been found that the material which is most perfectly suited to be used in combination with mica for sealing off such coarse-grained, porous formation is asbestos.

According to the present invention, whenever it is desired to regain lost circulation, or to prevent loss of circulation when drilling through a porous formation layer, there is added to the usual mudflush of normal colloidal properties a suitable quantity of preferably fine mica flakes, such as from 1% to 5% by weight, and approximately the same amount of preferably long-fiber asbestos, the size of the mica flakes being of the order of .5 to 2.5 mm. and the length of the asbestos fibers being of the order of 2 to 6 cm. A mud comprising the above sealing materials quickly forms a substantially fluid-impervious sheath on the walls of the borehole, the mica flakes closing the interstices between the coarse sand grains, and the fibrous asbestos exerting what may be described as a gasket action between the hard, irregularly-shaped sand grains and the hard mica flakes in contact therewith to stop the flow of the fluid into the formation.

The use of mica in combination with asbestos as sealing material possesses the following advantages over the use for the same purpose of other materials:

1. It forms a mudsheath effectively stopping penetration of the fluid into any coarse-grained porous formation in cases where the use in the mudflush of a single sealing agent, such as mica, or even of a combination of two sealing materials, such, for example, as mica and fibrotex (hashed cane sugar fibers) fails to effect such stoppage, as may be seen from the data of Table I, obtained during experiments in which a coarse gravel pack was used to duplicate the effect of a coarse-grained formation. A 75 lbs./cu. ft. Palos Verdes drilling fluid was used.

while substantially fluid-impervious, are of a relatively very small thickness, since the growth of the sheath thickness stops the moment the mudflush ceases to percolate therethrough, and no further particles are deposited on the sheath due to said percolation. On the other hand, materials such, for example, as a mixture of mica with cane sugar fibers, which are not capable of totally stopping the flow of the fluid into the formation, form mudsheaths continually growing in thickness. The formation of fluid-permeable, excessively thick mudsheaths has in addition to the disadvantage of a continuing fluid loss, that of decreasing the internal diameter of the borehole, which restricts the cross-section available for mudflush circulation and may lead to an ultimate freezing of the drill string.

3. The thin mudsheath formed under high pressures of mica and asbestos, which are both inorganic substances comprising silicon compounds and having a natural affinity for each other, possesses considerable mechanical strength and high powers of adhesion to the walls of the borehole, while the thick and porous mat formed of mica and any organic fibrous materials adheres very poorly to the walls of the borehole, and can be very easily scraped off, for example, by the action of the drill string when the latter is raised for replacing a worn bit, or by the descending casing string when it is desired to case off a portion of the borehole, with the result that circulation may be lost at this critical stage of the operations.

4. Mudsheaths formed of drilling fluids comprising mica and asbestos are not susceptible to the action of acids and are therefore definitely superior to mudsheaths comprising organic components, such as sawdust, cottonseed hulls, shredded sugar cane, etc., which are easily disintegrated by any accidental contact with acid intended to treat an oil layer, whereby not only the oil, but also the water production of the well may be increased by an acid treatment. The use of a mica-asbestos mudflush when drilling through a porous or water-bearing layer overlying or adjacent an oil-bearing sand will, on the other hand, give an acid-resistant sheath which will permit the acid treatment to be applied to the well without the necessity of taking elaborate and costly measures, such as the use of packers, etc., to limit the application of the acid to the desired oil-bearing horizon.

It is obvious that in such case, after drilling through the water-bearing sands and penetrating into the oil-bearing formation, the composition of the drilling fluid should preferably be modified to one capable of giving an acid-soluble sheath over the face of the oil-bearing formation, such as a drilling fluid comprising calcium

*Table I*

| | Sealing material added to mudflush (percent by weight) | Amount of fluid passed through sheath in c. c. | | Thickness of sheath formed | Remarks |
|---|---|---|---|---|---|
| | | After 1 m. | After 10 m. | | |
| 1 | 2.5% long fiber asbestos+2.5% mica | 4.0 | 36.0 | 17 mm | Immediate shut-off; sheath penetrates gravel so that consolidation and good adherence result. |
| 2 | 5% long fiber asbestos | 10.0 | 52.5 | 25 mm | Filtration rate through sheath higher than above. |
| 3 | 5% mica | 54.5 | 64.0 | Too fragile to measure. | Slight penetration of mica into formation. |
| 4 | 5% fine fibrotex | 13.0 | 68.0 | 29 mm | Sheath mostly on top of gravel with but slight penetration, filtration rate higher than above. |
| 5 | 5% coarse fibrotex | 800 | | 75 mm | Sheath entirely on top of gravel with no penetration or adhesion. |
| 6 | 2.5% fine fibrotex+2.5% mica | 97.0 | 150.0 | 25 mm | No penetration of fibrotex. Slight penetration of mica. |

It will be seen from these figures that the use of a mica-asbestos sealing mixture in the drilling fluid results in a practically immediate shut-off, whereas that of practically any other material or mixture gives only a delayed shut-off, whereby huge amounts of liquid are sometimes permitted to penetrate into the formation before any sort of a sheath is formed on the walls of the borehole, and the filtration rate is somewhat decreased.

2. Due to the quick action of the mica-asbestos mixture in stopping the flow of the drilling fluid into the formation, the sheaths formed with drilling fluids comprising these materials, carbonate or any of the organic fibrous materials mentioned above.

We claim as our invention:

1. In the drilling of oil wells, the method of overcoming loss of circulation comprising the steps of adding mica flakes and asbestos fibers to the drilling fluid, circulating the resulting composition in the well in contact with the face of a coarse-grained porous formation, and causing said composition to form a substantially fluid-impervious sheath on the face of said formation.

2. In the process of drilling oil well boreholes, the steps of circulating a drilling fluid comprising mica flakes and asbestos fibers in the borehole while drilling through porous non-producing formations, causing an acid-resistant sheath to be formed over the face of said formation, modifying the composition of the mudflush by adding thereto an acid-soluble component while drilling through a producing formation, whereby an acid-soluble sheath is caused to form over the face of said formation.

3. A fluid composition for forming a mud-sheath over the face of coarse-grained porous formations traversed by a well, comprising a drilling fluid, mica flakes and asbestos fibers.

4. A fluid composition for forming a mud-sheath over the face of coarse-grained porous formations traversed by a well, comprising a drilling fluid having added thereto less than 5% by weight of mica flakes and less than 5% by weight of asbestos fibers.

5. A fluid composition for forming a mud-sheath over the face of coarse-grained porous formations traversed by a well, comprising a drilling fluid, mica flakes and long fiber asbestos.

6. A fluid composition for forming a mud-sheath over the face of coarse-grained porous formations traversed by a well, comprising a drilling fluid having added thereto less than 5% by weight of mica flakes and less than 5% by weight of asbestos fibers having a fiber length of at least 2 centimeters.

JOHN W. FREELAND.
HAROLD T. BYCK.